United States Patent [19]

Addicks

[11] 3,995,945
[45] Dec. 7, 1976

[54] AXLE ADJACENT MOUNTED BICYCLE MIRROR ASSEMBLY

[76] Inventor: Lyle F. Addicks, 12313 Brookshire Ave., Downey, Calif. 90242

[22] Filed: Oct. 20, 1975

[21] Appl. No.: 625,014

[52] U.S. Cl. ............................. 350/307; 248/481
[51] Int. Cl.$^2$ ................................. G02B 5/10
[58] Field of Search ........... 350/307, 302, 97, 100; 248/475 R, 476, 479, 481–486

[56] References Cited
UNITED STATES PATENTS 516,910  3/1894  Bucherer ..................... 350/307

FOREIGN PATENTS OR APPLICATIONS

| 793,327 | 4/1958 | United Kingdom ............ 350/307 |
| 1,172,382 | 11/1969 | United Kingdom ............ 350/307 |
| 451,131 | 7/1936 | United Kingdom ........... 248/475 R |

Primary Examiner—John K. Corbin
Assistant Examiner—Jon W. Henry
Attorney, Agent, or Firm—Boniard I. Brown

[57] ABSTRACT

A rear view mirror for a bicycle is mounted on the front wheel fork close to the wheel axis by attaching the mirror either directly to the axle or to one arm of the fork adjacent the axle, to improve the riders field of view in the mirror.

15 Claims, 4 Drawing Figures

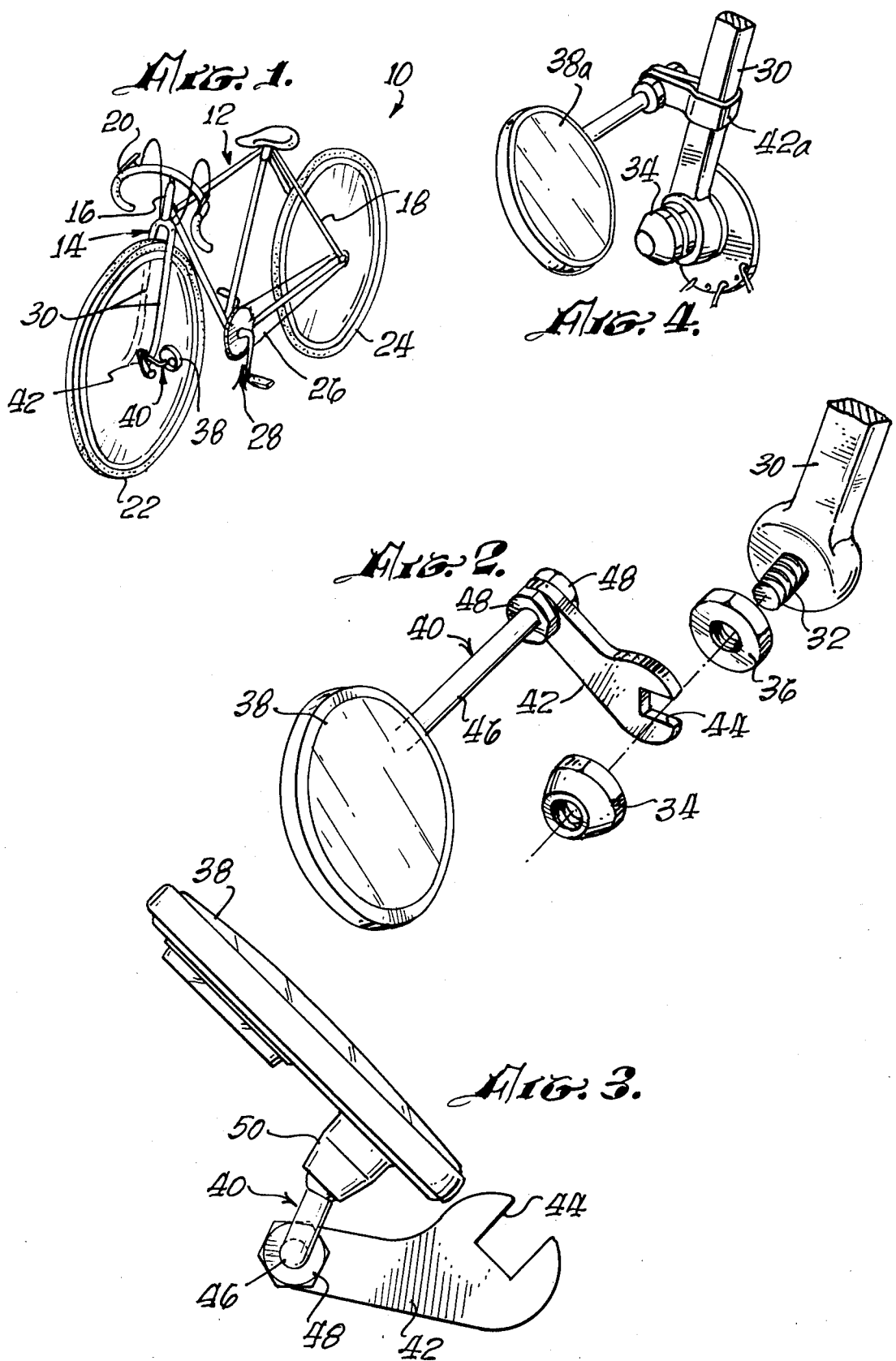

AXLE ADJACENT MOUNTED BICYCLE MIRROR ASSEMBLY

BACKGROUND OF THE INVENTION

1. Field of the Invention

This invention relates generally to bicycle accessories and more particularly to an improved rear view mirror arrangement for a bicycle.

2. Discussion of the Prior Art

Because of the ever increasing popularity of bicycle riding for recreation, sport and exercise, bicycle safety is being stressed more and more. One bicycle accessory which contributes substantially to bicycle safety is a rear view mirror.

Heretofore, it has been common practice to mount such a rear view mirror on the handle bar of a bicycle. This mounting arrangement has certain disadvantages which the present invention overcomes. First, mounting the mirror on the handle bar locates the mirror at the level of the rider's upper body portion. This portion of the body, measured from the outerside of one arm to the outerside of the other arm, is relatively wide, with the result that such upper body portion projects a substantial distance beyond each side of the bicycle frame and often obstructs the rider's field of view in the mirror. Secondly, the arrangement of the handle bar, brakes and shift lever of a racing bicycle is such that the rider shifts the position of his hands and arms quite frequently when operating the brakes and shift lever. In many of these positions, the rider's field of view in the mirror is at least partially obstructed.

With a handle bar mounted mirror, the only way of avoiding such obstruction of the rider's field of view is to provide the mirror with a mounting bracket which is sufficiently long to locate the mirror a substantial distance laterally outboard of the handle bar. This outboard location of the mirror is undesirable since it renders the mirror prone to damage, is inconvenient when storing the bicycle, and requires a relatively rugged and costly mirror mounting bracket.

SUMMARY OF THE INVENTION

This invention provides an improved mounting arrangement for a bicycle rear view mirror which avoids the foregoing and other disadvantages of a handle bar mounted mirror. According to the invention, a mirror, preferably a convex mirror, is mounted on the front wheel frame fork close to the front wheel axis. This placement of the mirror locates the latter at the level of the bicycle pedals and hence at the level of the rider's feet and legs. The rider's legs are normally positioned close to the bicycle frame and present a substantially smaller overall width and lateral projection beyond the frame than the rider's upper body portion. Moreover, during the upper half of each rotation of the adjacent bicycle pedal, the corresponding leg and foot of the rider are elevated above the level of the mirror.

Accordingly, the present bicycle mounting arrangement is such that even a relatively small lateral projection of the mirror beyond the front wheel fork provides the rider with a substantially unobstructed rear view in the mirror.

Two embodiments of the invention are described. In one embodiment, the mirror is mounted directly on the front wheel axle and held in position by the front wheel axle nuts. In the second embodiment, the mirror is attached to one arm of the front wheel fork close to the wheel axle.

BRIEF DESCRIPTION OF THE DRAWINGS

FIG. 1 is a perspective view of a bicycle mounting a rear view mirror in accordance with the invention;

FIG. 2 is an enlarged exploded perspective view of the mirror mounting arrangement;

FIG. 3 is a side elevation of the mirror; and

FIG. 4 illustrates a modified mirror mounting arrangement according to the invention.

DESCRIPTION OF THE PREFERRED EMBODIMENT

Referring first to FIGS. 1–3, the illustrated bicycle 10 is conventional and hence need not be described in elaborate detail. Suffice it to say that the bicycle has a frame 12 including a front wheel fork 14 which is journaled in a bearing 16 at the front end of the main frame portion 18 and mounts a handle bar 20 for steering the bicycle by turning the fork. The fork mounts a front wheel 22 and the main frame portion mounts a rear wheel 24. Rear wheel 24 is connected by a sprocket chain 26 to the pedal assembly 28 rotatable on the main frame portion.

The front frame fork 14 has arms 30 which straddle the front wheel 22. The lower ends of these arms have openings receiving the threaded ends of the front wheel axle 32. The axle is fixed to the fork arms by nuts 34 threaded on the outer axle ends and backed up by washers 36 on the axle.

According to this invention, the mirror 38, preferably a convex mirror, is mounted, by means of a bracket 40, on the front wheel frame fork 14 close to the axis of the front wheel 22. The mirror is adjustable to suit the rider. As noted earlier, this mirror placement locates the mirror at the level of the pedal assembly 28 and provides the rider with a relatively unobstructed rear view in the mirror.

In FIGS. 1–3, the mirror 38 is mounted directly on the front wheel axle 32. To this end, the mirror mounting bracket 40 includes a flat plate like arm 42 which is longitudinally slotted at one end at 44 to fit over one threaded end of the axle between the corresponding axle nut 34 and washer 36. The nut is tightened to firmly secure the arm to the axle. Extending through the opposite or outer end of the arm 42, normal to its plane, is a rod 46 which is firmly fixed to the arm by nuts 48 threaded on the rod at opposite sides of the arm. Mirror 38 is mounted on the opposite or outer end of the rod by a ball and socket coupling 50.

It will now be understood that when the mirror assembly, comprising the mirror 38 and its mounting bracket 40, is mounted on the bicycle 10, the bracket arm 42 is disposed in a plane normal to the axis of the front wheel 22, the bracket rod 46 parallels the axis and extends laterally out from the front wheel frame fork 14 and the mirror faces generally rearwardly and upwardly, laterally of the bracket rod. The mirror assembly has three adjustments. One adjustment involves rotation of the bracket arm 42 about the front wheel axle 32 by loosening the adjacent axle nut 34. The second adjustment involves rotation of the bracket rod 46 about its longitudinal axis by loosening the rod nuts 48. The third adjustment involves swivel adjustment of the mirror 38 relative to the rod 46 about the swivel center of the ball and socket coupling 50. These adjustments enable the rider to position the mirror for a relatively unobstructed rear view, as described earlier.

The modified mirror assembly of FIG. 4 is similar to that of FIGS. 1–3 except that the bracket arm 42 of the latter figures is replaced by a clamp arm 42a for attaching the assembly to one arm 30 of the front wheel fork 14. This modified mirror assembly is mounted on the lower end of the fork arm close to the front wheel axle 32 to provide the rider with the same unobstructed rear view in the mirror 38a as in the mirror assembly of FIGS. 1–3.

The Inventor claims:

1. In combination:
    a bicycle comprising a frame including a rotatable front fork having spaced arms, and wheels including a front wheel positioned between and rotatably mounted on said fork arms, and
    a rear view mirror assembly mounted on one of said fork arms close to the front wheel axis including a mirror reflector disposed laterally outboard of said fork.

2. The combination according to claim 1 wherein:
    said mirror assembly comprises a mounting bracket including a rod extending outwardly from said fork arm generally parallel to said front wheel axis, means mounting the inner end of said rod on said fork arm, and means mounting said mirror reflector on the outer end of said rod.

3. The combination according to claim 2 wherein:
    said mounting bracket includes means for rotatably adjusting said rod about its longitudinal axis, and
    said mirror reflector means comprises a ball and socket coupling.

4. The combination according to claim 3 wherein:
    said front wheel has an axle extending through said fork arms,
    nuts threaded on the ends of said axle for securing the latter to said fork arms, and
    said rod mounting means comprises an arm secured to and extending laterally of said inner rod end and positioned over and in a transverse plane of said axle between one fork arm and the adjacent axle nut.

5. The combination according to claim 4, wherein:
    said rod arm is slotted to receive said axle and is adjustable about the axle.

6. The combination according to claim 3, wherein:
    said rod mounting means comprises a clamp attached to one fork arm.

7. The combination according to claim 1 wherein:
    said front wheel has an axle extending through said fork arms,
    nuts threaded on the ends of said axle for securing the latter to said fork arms, and
    said rod mounting means comprises an arm secured to and extending laterally of said inner rod end and positioned over and in a transverse plane of said axle between one fork arm and the adjacent axle nut.

8. The combination according to claim 7 wherein:
    said rod arm is slotted to receive said axle and is adjustable about the axle.

9. The combination according to claim 1 wherein:
    said rod mounting means comprises a clamp attached to one fork arm.

10. The combination according to claim 1 wherein:
    said mirror reflector is a convex reflector.

11. A rear view mirror assembly for a bicycle comprising:
    a frame including a rotatable front fork having spaced arms, and wheels including a front wheel positioned between and rotatably mounted on said fork arms,
    a mounting bracket including a rod, and means at one end of said rod for mounting said rod on one of said front bicycle fork arms close to the front wheel axis with the rod extending laterally from the fork generally parallel to said axis,
    a mirror reflector, and
    means mounting said reflector on the other end of said rod with the mirror facing laterally of the rod.

12. A mirror assembly according to claim 10 wherein:
    said rod mounting means comprises an arm extending laterally of said rod and having an opening for receiving the front wheel axle, and
    said mirror mounting means comprises a ball and socket coupling.

13. A mirror assembly according to claim 11 wherein:
    said rod mounting means comprises means securing said rod to said rod arm for rotatable adjustment of said rod about its longitudinal axis relative to said rod arm, and
    said rod arm opening comprises a slot opening through the outer end of said rod arm.

14. A mirror assembly according to claim 10 wherein:
    said rod mounting means comprises a clamp for attachment to one fork arm, and
    said mirror mounting means comprises a ball and socket coupling.

15. A mirror assembly according to claim 13 wherein:
    said rod mounting means comprises means securing said rod to said clamp for rotatable adjustment of said rod about its longitudinal axis relative to said clamp.

* * * * *